(12) United States Patent
Strömer et al.

(10) Patent No.: US 11,530,883 B2
(45) Date of Patent: Dec. 20, 2022

(54) HEADER FOR A HEAT EXCHANGER AND A HEAT EXCHANGER

(71) Applicant: ALFA LAVAL CORPORATE AB, Lund (SE)

(72) Inventors: Fredrik Strömer, Kävlinge (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 763 days.

(21) Appl. No.: 16/461,714

(22) PCT Filed: Nov. 28, 2017

(86) PCT No.: PCT/EP2017/080615
§ 371 (c)(1),
(2) Date: May 16, 2019

(87) PCT Pub. No.: WO2018/114237
PCT Pub. Date: Jun. 28, 2018

(65) Prior Publication Data
US 2019/0383565 A1 Dec. 19, 2019

(30) Foreign Application Priority Data
Dec. 20, 2016 (EP) .................................. 16205249

(51) Int. Cl.
*F28F 9/02* (2006.01)
*F28D 7/00* (2006.01)
*F28F 7/02* (2006.01)

(52) U.S. Cl.
CPC .......... *F28F 9/0202* (2013.01); *F28D 7/0008* (2013.01); *F28F 7/02* (2013.01);
(Continued)

(58) Field of Classification Search
CPC ...... F28F 9/0202; F28F 9/0263; F28F 9/0265; F28F 9/0268; F28F 9/0282; F28F 9/0204;
(Continued)

(56) References Cited

U.S. PATENT DOCUMENTS 2,099,186 A * 11/1937 Anderegg .............. F25B 39/028
165/110
4,524,823 A * 6/1985 Hummel ................ F25B 39/028
165/174
(Continued)

FOREIGN PATENT DOCUMENTS

CA 2971294 A1 * 6/2016 ........... F28D 9/0018
CN 101432590 A 5/2009
(Continued)

OTHER PUBLICATIONS

International Search Report, issued in PCT/EP2017/080615, dated Feb. 15, 2018.
(Continued)

*Primary Examiner* — Tho V Duong
(74) *Attorney, Agent, or Firm* — Birch, Stewart, Kolasch & Birch, LLP

(57) ABSTRACT

The disclosure relates to a header connected to or formed as a part of a heat exchanger. The heat exchanger has a heat exchanger body with a plurality of discrete channels for a first fluid and a plurality of discrete channels for a second fluid. The header has a first end having a round configuration and a second end being provided with a plurality of discrete channels. The header is provided with a plurality of dividers dividing one or more internal channels of the circular pipe into the plurality of discrete channels at the second end. At least some of the dividers extend from the second end to the first end and define a plurality of channel mouths at the first end. The disclosure also relates to a heat exchanger.

17 Claims, 7 Drawing Sheets

(52) U.S. Cl.
CPC .......... *F28F 9/0214* (2013.01); *F28F 9/0265* (2013.01); *F28F 2210/02* (2013.01)

(58) Field of Classification Search
CPC ........ F28F 7/02; F28F 9/0214; F28F 2210/02; F28D 7/0008
See application file for complete search history.

(56) References Cited

U.S. PATENT DOCUMENTS

| | | | |
|---|---|---|---|
| 6,161,616 | A | 12/2000 | Haussmann |
| 7,285,153 | B2 | 10/2007 | Bruun et al. |
| 8,196,647 | B2 | 6/2012 | Bruun et al. |
| 8,381,804 | B2 * | 2/2013 | Slaughter .................. F28F 9/22 165/165 |
| 2004/0261379 | A1 | 12/2004 | Bruun et al. |
| 2005/0217837 | A1 | 10/2005 | Kudija, Jr. |
| 2006/0090879 | A1 | 5/2006 | Han |
| 2009/0000327 | A1 | 1/2009 | Burk et al. |
| 2010/0162749 | A1 | 7/2010 | Yoshimura et al. |
| 2014/0000841 | A1 * | 1/2014 | Baker .................. F28F 17/005 165/59 |
| 2014/0231057 | A1 * | 8/2014 | Schalansky ............. F28F 3/048 165/169 |
| 2017/0146305 | A1 * | 5/2017 | Kuczek ................. F28F 9/0256 |

FOREIGN PATENT DOCUMENTS

| | | | |
|---|---|---|---|
| DE | 854 363 | C | 11/1952 |
| DE | 195 12 351 | C1 | 11/1996 |
| DE | 197 19 257 | A1 | 11/1998 |
| DE | 10 2006 059 504 | A1 | 6/2007 |
| EP | 0 566 899 | A1 | 10/1993 |
| EP | 2 009 380 | A1 | 12/2008 |
| EP | 2 015 006 | A2 | 1/2009 |
| EP | 2009380 | B1 | 2/2014 |
| EP | 2889570 | B1 | 8/2017 |
| GB | 1413473 | A * | 11/1975 ............ F28D 17/04 |
| JP | 2006-125835 | A | 5/2006 |
| JP | 2014-16083 | A | 1/2014 |
| WO | WO 2007/122685 | A1 | 11/2007 |
| WO | WO 2013/163398 | A1 | 10/2013 |

OTHER PUBLICATIONS

Written Opinion of the International Searching Authority, issued in PCT/EP2017/080615, dated Feb. 15, 2018.
Chinese Office Action and Search Report for Chinese Application No. 201780078728.8, dated Apr. 29, 2020, with an English translation.
English translation of the Japanese Office Action and Search Report, dated Jun. 8, 2020, for Japanese Application No. 2019-533186.
English translation of Korean Office Action for Korean Application No. 10-2019-7020813, dated Sep. 3, 2020.

* cited by examiner

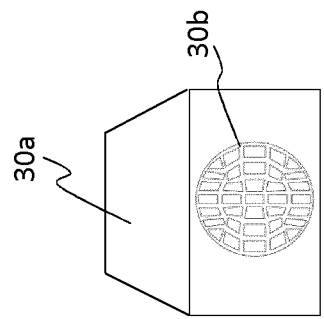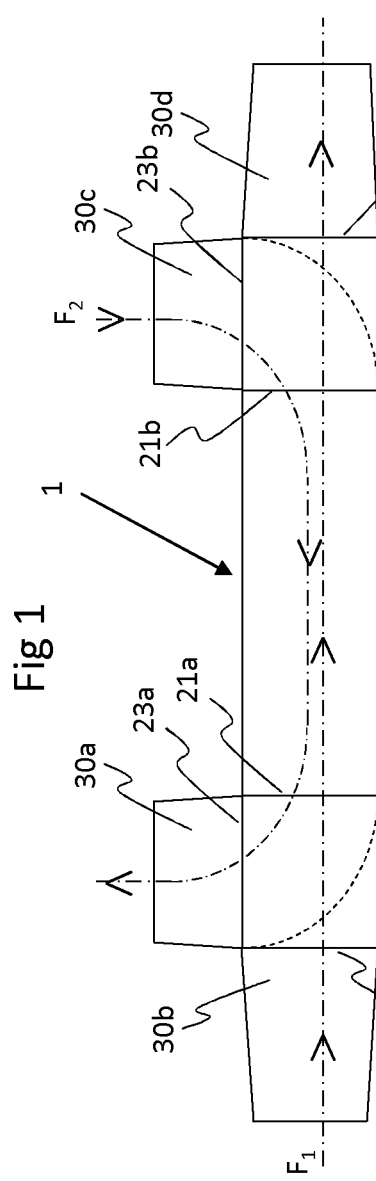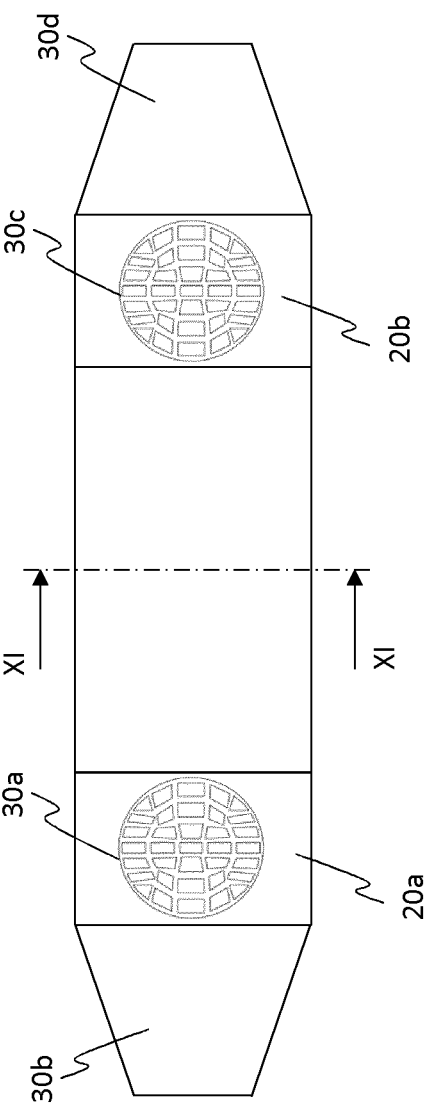

C-C

B-B

HEADER FOR A HEAT EXCHANGER AND A HEAT EXCHANGER

FIELD OF INVENTION

The invention relates to a header for a heat exchanger having a heat exchanger body with a plurality of discrete channels for a first fluid and a plurality of discrete channels for a second fluid.

The invention also relates to a heat exchanger comprising a central heat exchanger body with a plurality of discrete channels for a first fluid and a plurality of discrete channels for a second fluid, and a header.

TECHNICAL BACKGROUND

When designing heat exchangers, there are a number of issues that typically need to be taken into account. It is typically desirable to have the surface areas of the walls between the two fluids to be as large as possible in order to maximize the thermal contact between the relatively hot and cold fluids. It is also typically desirable to minimize flow resistance or pressure losses or at least to avoid undue flow resistance or pressure losses. It is typically also desirable to keep the size of the heat exchangers as small as possible. It is typically also desirable to keep the weight, cost and/or amount of material used in the heat exchanges at a minimum. Sometimes the solution to one issue is also beneficial with respect to one or more other issues and sometimes the solutions are contradictory and the solutions to the respective issues need to be balanced.

U.S. Pat. No. 7,285,153 B2 discloses an equipment for feeding two gases into and out of a multi-channel monolithic structure. In this equipment, the gases are separated at the outlet and inlet of the monolithic structure by a manifold formed of a plurality of upright standing lamellar plates. Each elongated volume between the lamellar plates is aligned with a line of channels in the monolithic structure. When using the monolithic structure in a line configuration, i.e. with the channels for the different gases extending alongside each other forming alternating lines, the manifold formed of the lamellar plates is connected directly to the monolithic structure. When using the monolithic structure in a checkered configuration, i.e. with the channels for the different gases extending alongside each other in a checkered pattern, there is a distributor plate provided between the manifold and the monolithic structure. The distributor plate has a hole pattern allowing the respective volume in the manifold to communicate with the intended set of channels.

U.S. Pat. No. 8,196,647 B2 discloses an equipment for distribution of two fluids into and out of channels in a multi-channel monolithic structure where the channel openings are spread over an entire cross-sectional area of the monolithic structure. The equipment consists of a manifold head and one or more monolith structures. The manifold head is formed of a plurality of upright standing lamellar plates. Each elongated volume between the lamellar plates has a central portion where inlet/outlet is formed. Between the manifold of lamellar plates and the monolith structure, there is provided four plates each having different hole patterns. The hole patterns are formed of both circular holes and long holes. The hole patterns are intended to distribute the fluids from the manifold over the monolithic structure.

WO2013/163398A1 discloses a heat exchange tube produced by additive manufacturing for the production of augmented heat exchange features, such as external and internal lattice structure. However, this is related to maximizing heat dissipating surface area of a tube.

One advantage with using a great number of channels in a monolith structure as e.g. in U.S. Pat. No. 7,285,153 B2 and U.S. Pat. No. 8,196,647 B2 is that it is possible to use high pressurized fluids. Since the channels are so small, the pressure will due to the small areas of the channel walls only exert a limited force onto the channel walls, which in turn allows producing the walls using limited wall thickness. However, none of the prior art documents provide a solution concerning how to provide a transition from a piping system to a monolith structure without unacceptably high pressure losses.

SUMMARY OF INVENTION

It is an object of the invention to provide a transition from a piping system to a heat exchanger having a heat exchanger body with a plurality of discrete channels for a first fluid and a plurality of discrete channels for a second fluid.

This object has been achieved by a header adapted to be connected to and form part of or being integrally formed as a part of a heat exchanger, the heat exchanger having a heat exchanger body with a plurality of discrete channels for a first fluid and a plurality of discrete channels for a second fluid, the header having:

a first end having a round configuration being adapted to be connected to a circular pipe and to form an inlet to, or an outlet from, the heat exchanger; and a second end being adapted to be connected to or be integrally formed with the heat exchanger body and being provided with a plurality of discrete channels corresponding to the plurality of discrete channels for the first fluid in the heat exchanger body, wherein the header is provided with a plurality of dividers dividing one or more internal channels of the circular pipe into the plurality of discrete channels at the second end, wherein the dividers extend from the second end to or towards the first end, and wherein at least some of the dividers extend from the second end to the first end and define a plurality of channel mouths at the first end, the channel mouths together forming the round configuration of the first end.

This object has also been achieved by a header adapted to be connected to and form part of or being integrally formed as a part of a heat exchanger, the heat exchanger having a heat exchanger body with a plurality of discrete channels for a first fluid and a plurality of discrete channels for a second fluid, the header having:

a first end having a round configuration being adapted to be connected to a circular pipe and to form an inlet to, or an outlet from, the heat exchanger; and a second end being adapted to be connected to or be integrally formed with the heat exchanger body and being provided with a plurality of discrete channels, wherein each discrete channel at the second end of the header is adapted to be individually connected to or integrally formed with one discrete channel of the plurality of discrete channels for the first fluid in the heat exchanger body, wherein the header is provided with a plurality of dividers dividing one or more internal channels of the circular pipe into the plurality of discrete channels at the second end, wherein the dividers extend from the second end to or towards the first end, and wherein at least some of the dividers extend from the second end to the first end and define a plurality of channel mouths at the first end, the channel mouths together forming the round configuration of the first end.

A channel is preferably considered to be a discrete channel if it is separate from neighboring channels in that there is no functional flow of fluid between the one discrete channel and another discrete channel.

With a header of this kind, a flow of a fluid flowing from the circular pipe will be transformed into a plurality of parallel flows dedicated for respective one of the discrete channels of the heat exchanger body, or vice versa, with a minimum of flow resistance. This is e.g. useful in, but not limited to, situations where a circular pipe is adapted to be connected to a heat exchanger in which the discrete channels are arranged as a rectangular grid of channels.

The dividers extend from the second end to or towards the first end. Some, but not necessarily all, dividers extend from the second end to the first end. Those dividers that extend to the first end define a plurality of channel mouths at the first end, the channel mouths together forming the round configuration of the first end.

Preferred embodiments appear in the dependent claims and in the description.

At least a sub-set of the dividers may extend, in a cross-section across the channel mouths, along curved lines across the round configuration of the first end. This way it is possible to provide a great number of channel mouths and still having essentially the same cross-sectional area of respective channel mouth. By having essentially the same cross-sectional area of respective channel mouth, the flow will be divided into a plurality of essentially equal flows. This is typically beneficial when it comes to achieving a uniform pressure and heat exchange in a heat exchanger.

Any upstream channel, as seen in a main direction extending from the first end to the second end, may be uniquely connected to one or more downstream channels in the main direction.

This restriction is applicable both when it comes to cases where the dividers extend from the second end to the first end and to cases where some of the dividers extend to the first end and some dividers extend to one or more positions between the first and second ends. The unique connection is advantageous since it provides discrete channels at least at the second end.

The wording main direction is primarily to be understood as a label to a direction extending from the first end to the second end of the header. The main direction may be rectilinear, it may be formed of a plurality of mutually angled rectilinear portions or it may be curved. The main direction may in practice be considered a line along or counter which line the flow through the header is mainly directed.

The dividers may extend from the second end to the first end. This may be expressed as that all or at least essentially all the dividers extend from the second end to the first end. It may also be expressed as that at least 80%, preferably at least 90% and more preferably 100% of the dividers extend from the second end to the first end. This allows for a controlled division of the flow into discrete channels. It also allows for a compact design where the full length of the header may be used for changing the configuration from the round configuration at the first end to the desired configuration and the second end.

Each of the channel mouths formed at the first end may be uniquely associated with a discrete channel extending through the header. Thereby it is possible to uniquely control the flow of each channel by designing the shape and size of respective channel.

The discrete channels extending through the header may form the plurality of discrete channels at the second end of the header. Thereby there will be a secure and unique transfer of the flow through the respective channel from the header to the heat exchanger.

In one embodiment some dividers extend from the second end to the first end and some dividers extend from the second end to one or more positions between the second end and the first end. Thereby it is possible to, but not necessary to, design the header such that channels associated with the channel mouths at the first end are successively divided, as seen in the main direction extending from the first end to the second end, into a greater number of channels forming the plurality of discrete channels at the second end of the header. By having some dividers extending from the second end to the first end and some dividers extending from the second end to one or more positions between the second end and the first end, it is possible to allow the flow of fluid to even out differences in pressure or flow before being further divided into the discrete channels.

The plurality of channels at the second end of the header may be configured in a line configuration in that, in a cross-section across the plurality of channels, the plurality of channels is sub-divided into a plurality of groups, each group including a plurality of channels arranged along a line extending along a first direction across the cross-section of the second end. By sub-dividing the channels into such a line configuration, it is possible to in a following transition portion change the line configuration to a checkered configuration inside the main body of the heat exchanger.

The adjacent lines may along a second direction, transverse to the first direction, be separated a distance adapted to provide space for an intertwining of the line configured plurality of channels for the first fluid with a line configured plurality of channels for the second fluid. These line configured plurality of channels of the second fluid is preferably line configured by another header. It may be noted that this other header may be a different physical part or may be integrally formed together with the first header. By having a distance between the adjacent lines at the second end, it is possible to provide a compact design where it is possible to begin intertwining of the two flows directly at the second end of the header.

The plurality of discrete channels may at the second end be provided in a grid having a rectangular configuration. Such a rectangular configuration may e.g. be adapted to be connected to a heat exchanger having a central heat exchanger body having a rectangular cross-section across the plurality of discrete channels. In such heat exchanger body, the plurality of discrete channels for the first fluid and the plurality of discrete channels for the second fluid may be arranged in a checkered pattern.

The one or more dividers may have longitudinal extensions along the main direction extending from the first end to the second end being at least two times a minimum cross-sectional dimension of respective one of the plurality of channels at the second end. This way there is sufficient length along the flow direction to allow the round configuration at the first end to be smoothly transformed to a desired configuration, such as a rectangular configuration, at the second end without any unnecessary pressure losses in the header due to the change in configuration.

The above object has also been achieved by a heat exchanger comprising a central heat exchanger body with a plurality of discrete channels for a first fluid and a plurality of discrete channels for a second fluid, and a header as generally described in the above and as described in detail in the detailed description.

The advantages associated with providing a heat exchanger with the header has been discussed above in connection with the description of the header as such and those advantages are equally applicable to the heat exchanger.

Preferred embodiments of the heat exchanger appear in the dependent claims and in the description. It may also be noted that the preferred embodiments of the header are also applicable as preferred embodiments of the heat exchanger.

The plurality of discrete channels for the first fluid and the plurality of discrete channels for the second fluid may in the central heat exchanger body be arranged in a checkered pattern as seen in a cross-section extending across the plurality of discrete channels in the central heat exchanger body. It may be noted that the checkered pattern may be a truly checkered trough-out the cross-section of the central heat exchanger body. The checkered pattern may also be checkered in the central portions and have along its perimeters a configuration slightly different from truly checkered. For instance, along one perimeter the pattern may be formed of first fluid channels alternating with blocked channel spaces and along the opposing perimeter the pattern may be formed of second fluid channels alternating with blocked channel spaces. A true checkered pattern has a theoretical possibility to provide a greater heat exchange between the fluids in the central heat exchanger body, but it requires more complex line configuration of the channels at the second end of the header, potentially giving rise to greater pressure losses in the header. A checkered pattern with two opposing perimeters being only formed of the first fluid channels and the second fluid channels, respectively, have a slightly lower theoretical heat exchange capability, but it is easier to design a header making full use of the cross-sectional area to provide the line configuration of the channels at the second end, potentially avoiding unnecessary pressure losses in the header.

The heat exchanger may further comprise a transition portion. The transition portion may have a first outer portion in connection with a header of the kind described above forming a first fluid header for the first fluid and a second outer portion in connection with a further header of the kind described above forming a second fluid header for the second fluid. The transition portion may further have an inner portion in connection with the central heat exchanger body. The first outer portion may be provided with a plurality of channels for the first fluid forming first fluid channels arranged in a line configuration. The second outer portion may be provided with a plurality of channels for the second fluid forming second fluid channels arranged in a line configuration. The inner portion may be provided with the first fluid channels and the second fluid channels arranged in a checkered pattern. As mentioned above, this checkered pattern may be a truly checkered pattern or a checkered pattern with two opposing perimeters being only formed of the first fluid channels and the second fluid channels, respectively The transition portion may transform the line configuration of the first fluid channels by, between the first outer portion and the inner portion, gradually shifting every second first fluid channel in respective line relative to every other first fluid channel in respective line in a shift direction being transverse to the lines in the line configuration, and may transform the line configuration of the second fluid channels by, between the second outer portion and the inner portion, gradually shifting every second second fluid channel in respective line relative to every other second fluid channel in respective line in the shift direction, whereby said every second first fluid channels and said every second second fluid channels form lines across the shift direction alternating with lines formed of said every other first fluid channels and said every other second fluid channels. This way the line configuration at the interface between the header and the transition portion is transformed into a checkered pattern.

The transition portion may be integrally formed with the header and/or with the central body, preferably integrally formed with the header, and more preferably integrally formed with both the header and the central body. In one embodiment the transition portion is integrally formed with two headers. In one embodiment the transition portion is integrally formed with one header and the other header is separately manufactured and subsequently connected to the transition portion. In one embodiment the central heat exchanger body is integrally formed with one of the transition portions and the other transition portion is separately manufactured and subsequently connected to the central heat exchanger body. Each of the two transition portions may independently be of any of the kinds mentioned above being separate from the headers, being separate from one of the headers or being integrally formed with both headers. In one embodiment the central heat exchanger body is integrally formed with both transition portions. Each of the two transition portions may independently be of any of the kinds mentioned above being separate from the headers, being separate from one of the headers or being integrally formed with both headers. In one embodiment, the heat exchanger comprises a central heat exchanger body, two transition portions, one at either end of the central heat exchanger body, and four headers, at respective outer portions of the transition portions, integrally formed into a single body.

BRIEF DESCRIPTION OF THE DRAWINGS

The invention will by way of example be described in more detail with reference to the appended schematic drawings, which shows a presently preferred embodiment of the invention.

FIG. 1 is a side view of a heat exchanger.

FIG. 2 is another side view of the heat exchanger of FIG. 1.

FIG. 3 is an end view of the heat exchanger of FIGS. 1 and 2.

DETAILED DESCRIPTION OF PREFERRED EMBODIMENTS

Figure 5:
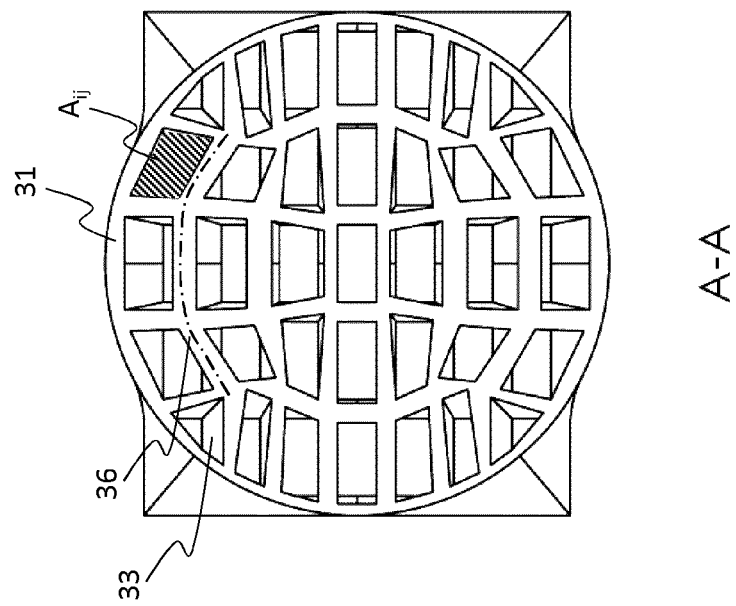
FIG. 5 is an end view of the header as seen along line A-A in FIG. 4.

FIGS. 1-3 discloses a heat exchanger 1 comprising a central heat exchanger body 10, two transition portions 20a-b, one at either end of the central heat exchanger body 10, and four headers 30a-d, at respective outer portions of the transition portions. In the disclosed embodiment, the central heat exchanger body 10, the two transition portions 20a-b and the four headers 30a-d are integrally formed into a single body. In FIG. 1, a flow direction $F_1$ for a first fluid and a flow direction $F_2$ for a second fluid are indicated. The first fluid enters into the heat exchanger via the header 30b, through the transition portion 20a to the central heat exchanger body 10 from which it leaves through the transition portion 20b and out via header 30d. The second fluid enters into the heat exchanger via the header 30c, through the transition portion 20b to the central heat exchanger body 10 from which it leaves through the transition portion 20a and out via header 30a. The central heat exchanger body 10 comprises a plurality of discrete channels $B_{ij}$ for a first fluid and a plurality of discrete channels $C_{ij}$ for a second fluid. Typically the flows of fluid are counter each other in the central heat exchanger body 10 as shown in FIG. 1. However, it is also conceivable that the flows of fluid are along the same direction in the central heat exchanger body 10. In FIGS. 1-3, the first fluid flows along the straight line at both ends of the heat exchanger and the second fluid changes direction (90° in the figures) at both ends of the heat exchanger. It is also conceivable that the second fluid flows along a straight line at one of the ends and that the first fluid changes direction at that end of the heat exchanger. There are numerous other conceivable configurations and orientations of the headers relative to the central heat exchanger body. In one embodiment both headers 30a and 30b form an angle, such as 45°, relative to the flow direction $F_1$ in the central heat exchanger body. The headers 30c and 30d may in such a case preferably also form corresponding angles, such as 45°.

The headers 30a-d will be described in more detail with reference to FIGS. 4-7 and will be collectively referred to as a header 30. The header 30 is adapted to be connected to and form part of or being integrally formed as a part of a heat exchanger 1. As will be explained in more detail below, the heat exchanger 1 has a heat exchanger body 10 with a plurality of discrete channels for a first fluid and a plurality of discrete channels for a second fluid.

Figure 4:
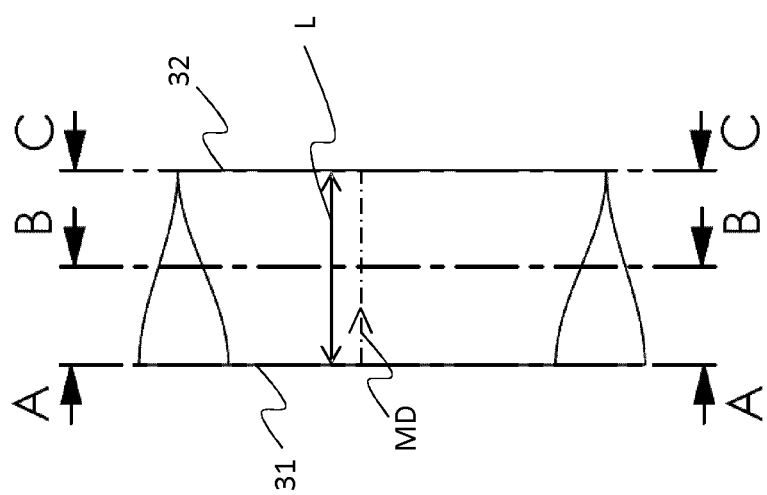
FIG. 4 is a side view of a header.
Figure 7:
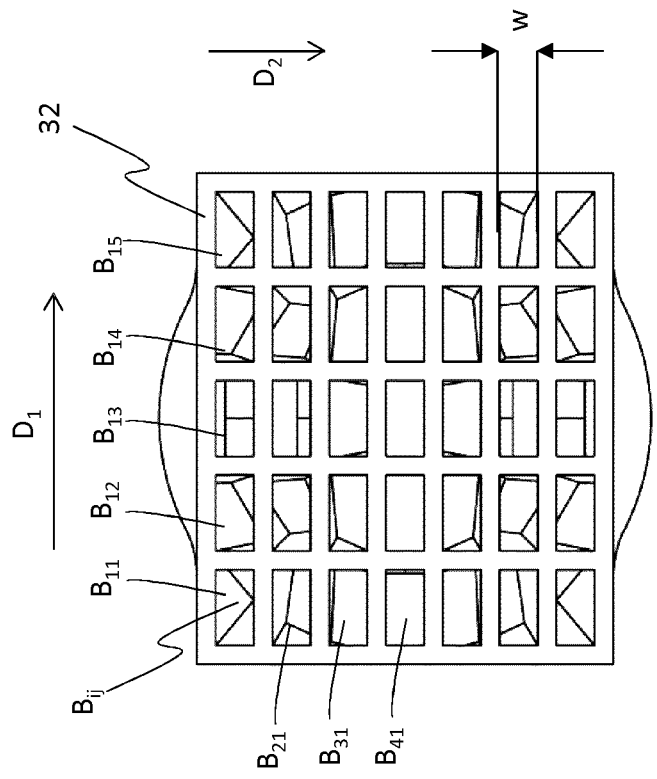
FIG. 7 is an end view of the header as seen along line C-C in FIG. 4.
Figure 6:
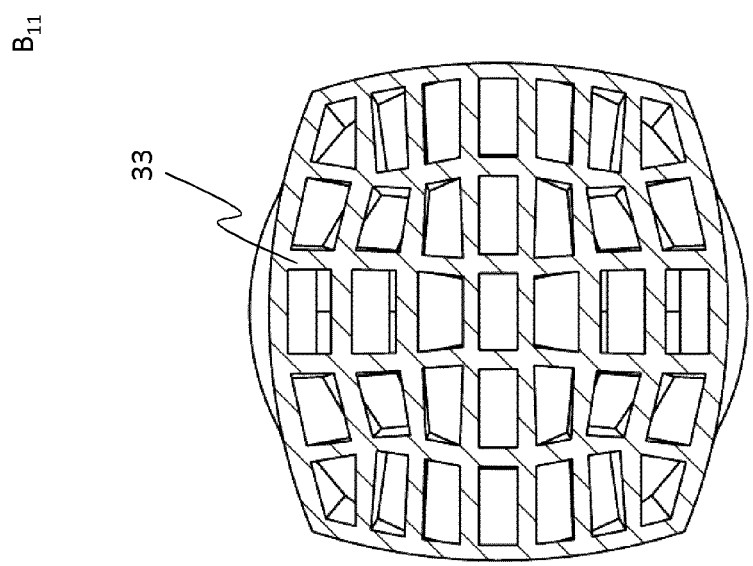
FIG. 6 is a cross-sectional view of the header as seen along line B-B in FIG. 4.

As shown in FIGS. 4 and 5, the header 30 has a first end 31 having a round configuration. The first end 31 is adapted to be connected to a circular pipe and to form an inlet to, or an outlet from, the heat exchanger 1. As shown in FIGS. 4 and 7, the header 30 has a second end 32. The second end 32 is adapted to be connected to or be integrally formed with the heat exchanger body 10. As shown in FIG. 7, the second end 32 is provided with a plurality of discrete channels $B_{ij}$ corresponding to the plurality of discrete channels for the first fluid in the heat exchanger body 10. The plurality of discrete channels $B_{ij}$ are at the second end 32 provided in a grid having a rectangular configuration. Each discrete channel $B_{ij}$ at the second end 32 of the header 30 is individually connected to or integrally formed with one (single) discrete channel $B_{ij}$ for the first fluid in the heat exchanger body 10. Correspondingly, each discrete channel $B_{ij}$ for the first fluid in the heat exchanger body 10 is individually connected to or integrally formed with one (single) discrete channel $B_{ij}$ at the second end 32 of the header 30. The number of discrete channels $B_{ij}$ at the second end 32 of the header 30 is the same as the number of discrete channels $B_{ij}$ for the first fluid in the heat exchanger body 10. Each discrete channel $B_{ij}$ at the second end 32 of the header 30 is individually connected to or integrally formed with one discrete channel $B_{ij}$ for the first fluid in the heat exchanger body 10 via one (single) discrete channel $B_{ij}$ in the transition portion 20.

As shown in FIG. 5, the header 30 is provided with a plurality of dividers 33 dividing the internal channel (or channels) of the circular pipe into the plurality of discrete channels $B_{ij}$ at the second end. The dividers 33 may also be referred to as internal walls. It may be noted that the dividers 33 or walls form a lattice or web across the first end 31 of the header 30. As is indicated in FIG. 4 and as becomes apparent from the cross-section B-B in FIG. 6, all the dividers 33 extend from the second end 32 to the first end 31. However, it may be noted that in a general concept the dividers 33 need not extend all the way to the first end 31. It is sufficient that the dividers 33 extend from the second end 32 towards the first end 31. However, to make the most use of the length of the header 30, at least some of the dividers 33 extend from the second end to the first end 31 and define a plurality of channel mouths $A_{ij}$ at the first end 31. In FIG. 5 one of the channel mouths $A_{ij}$ is indicated by a shading of the area of the channel mouth. As shown in FIG. 5, the channel mouths $A_{ij}$ together form the round configuration of the first end 31. In the disclosed embodiment, the dividers 33 or walls 33 are tight walls not allowing any fluid to flow from one channel associated with a first channel mouth $A_{ij}$ to any channel associated with any other channel mouth $A_{ij}$. Thereby the header 30 is capable of dividing the flow into discrete channels. As indicated in FIGS. 4 and 7, the dividers 33 have longitudinal extensions L along the main direction MD being at least two times a minimum cross-sectional dimension w of respective one of the plurality of channels $B_{ij}$ at the second end 32.

As shown in FIG. 5, at least a sub-set of the dividers 33 extend, in a cross-section across the channel mouths (FIG. 5), along curved lines (indicated by the dashed line 36) across the round configuration of the first end 31.

As shown in FIGS. 4-7, any upstream channel, as seen in a main direction MD extending from the first end 31 to the second end 32 is uniquely connected to one downstream channel in the main direction MD. This may also be expressed as that each of the channel mouths $A_{ij}$ formed at the first end is uniquely associated with a discrete channel $B_{ij}$ extending through the header.

This restriction would, when it comes to cases where some of the dividers extend to the first end and some dividers extend to one or more positions between the first and second ends, read that any upstream channel, as seen in a main direction MD extending from the first end 31 to the second end 32 is uniquely connected to one or more downstream channels in the main direction MD. In this case, some or all of the channels of respective one of the channel mouths $A_{ij}$ are destined to be divided, in one or more further steps, into the plurality of channels $B_{ij}$ at the second end 32. Thus, the number of channels $B_{ij}$ at the second end 32 of the header may be larger than the number of channel mouths $A_{ij}$ at the first end 31. The main direction does not necessarily coincide with the direction of the fluid flow through the header, since the fluid flow through the header may either be in the direction of the main direction or in the opposite direction of the main direction. The main direction is a way of defining relative locations. An upstream channel is located closer to the first end 31 than a downstream channel and a downstream channel is located closer to the second end 32 than an upstream channel.

As shown in FIG. 7, the plurality of channels $B_{ij}$ at the second end 32 of the header 30 are configured in a line configuration. The line configuration may be defined as that, in a cross-section (FIG. 7) across the plurality of channels $B_{ij}$, the plurality of channels is sub-divided into a plurality of groups, each group including a plurality of channels $B_{1j}$, $B_{2j}$, etc, arranged along a line extending along a first direction $D_1$ across the cross-section of the second end 32. By sub-dividing the channels $B_{ij}$ into such a line configuration, it is prepared for in a following transition portion 20 changing the line configuration to a checkered configuration inside the central heat exchanger body 10 of the heat exchanger 1.

In FIGS. 8-11, a transformation from a round configuration of channels for single fluid to a checkered configuration for two fluids is schematically disclosed. The header 30 has a first end 31 provided with a plurality of channel mouths $A_{ij}$ separated by a plurality of dividers 33. Each such channel mouth $A_{ij}$ is uniquely associated with a channel $B_{ij}$ at the second end 32. $A_{11}$ is associated with $B_{11}$; $A_{21}$ is associated with $B_{21}$, etc.

Figure 9:
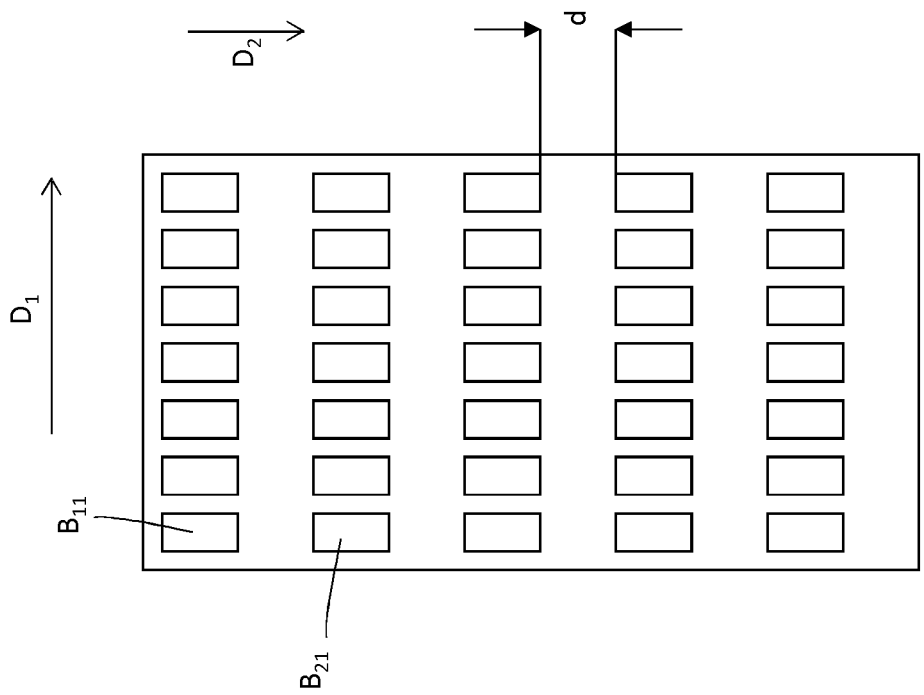
FIG. 9 shows schematically the other end of the header of FIG. 8.
Figure 10:
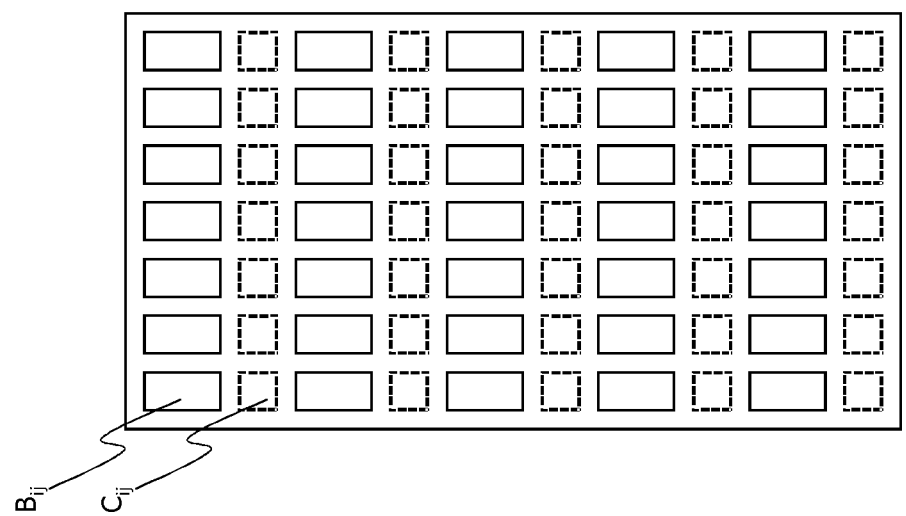
FIG. 10 shows schematically the end of FIG. 9 also indicating the position of channels from another header.

As shown in FIG. 9, the adjacent lines, such as $B_{1j}$ and $B_{2j}$, are separated a distance d as measured in the second direction $D_2$, transverse to the first direction $D_1$. As indicated in FIG. 10, this distance d is adapted to provide space for an intertwining of the line configured plurality of channels $B_{ij}$ for the first fluid with a line configured plurality of channels $C_{ij}$ for the second fluid.

Figure 11:
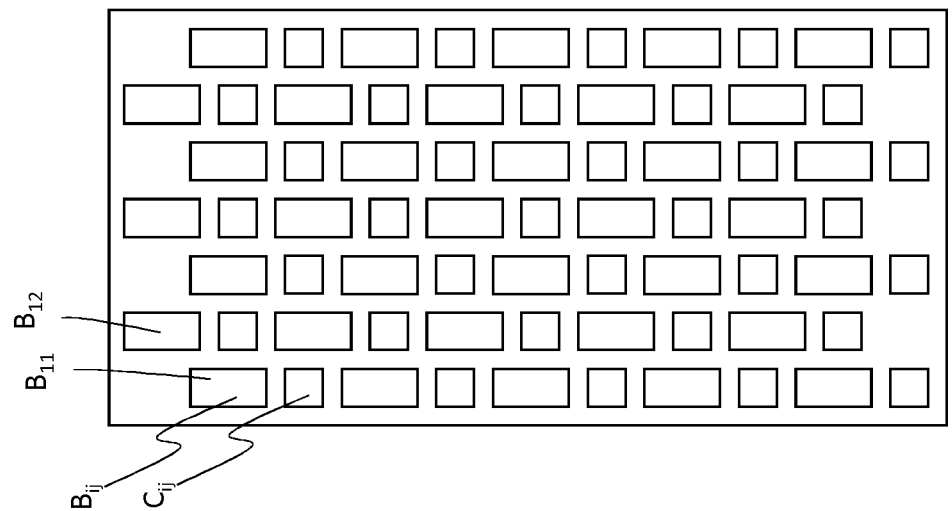
FIG. 11 shows schematically a cross-section along line XI-XI in FIG. 2 disclosing a checkered pattern formed from the configuration of channels of a header of FIGS. 8 and 9.
Figure 15:
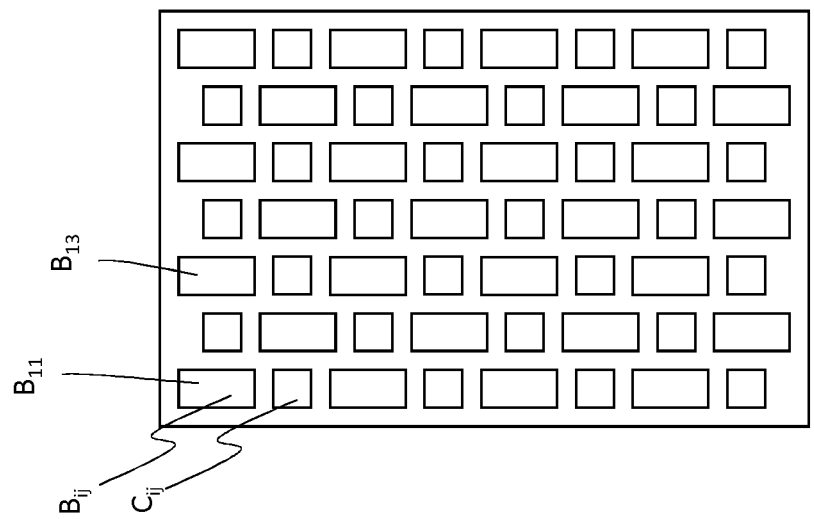
FIG. 15 shows schematically a cross-section along line XI-XI in FIG. 2 disclosing a checkered pattern formed from the configuration of channels of a header of FIGS. 12 and 13.

The plurality of discrete channels $B_{ij}$ for the first fluid and the plurality of discrete channels $C_{ij}$ for the second fluid is in the central heat exchanger body 10 arranged in a checkered pattern as seen in a cross-section (FIG. 11 and FIG. 15) extending across the plurality of discrete channels in the central heat exchanger body. It may be noted that the checkered pattern may be a truly checkered trough-out the cross-section of the central heat exchanger body (as shown in FIG. 15). The checkered pattern may also be checkered in the central portions and have along its perimeters a configuration slightly different from truly checkered. For instance, along one perimeter the pattern may be formed of first fluid channels alternating with blocked channel spaces and along the opposing perimeter the pattern may be formed of second fluid channels alternating with blocked channel spaces (as shown in FIG. 11).

It should be noted that the number of channels is in practice often significantly greater than the number of channels indicated in the figures. In some aspects, the channels may have a square cross-section with the sides of 0.5 mm to 2 mm. In some aspects, the wall thickness between the channels may be about 0.05 mm to 0.4 mm.

As mentioned above, the heat exchanger 1 further comprises transition portions 20a-b collectively denoted 20. The transition portion 20 has a first outer portion 22 in connection with a header 30 of the kind described above forming a first fluid header for the first fluid and a second outer portion 23 in connection with a further header 30 of the kind described above forming a second fluid header for the second fluid. The transition portion has an inner portion 21 in connection with the central heat exchanger body 10. The first outer portion 22 is provided with a plurality of channels for the first fluid forming first fluid channels arranged in a line configuration. The second outer portion 23 is provided with a plurality of channels for the second fluid forming second fluid channels arranged in a line configuration. The inner portion 21 is provided with the first fluid channels and the second fluid channels arranged in a checkered pattern. As mentioned above, this checkered pattern may be a truly checkered pattern or a checkered pattern with two opposing perimeters being only formed of the first fluid channels and the second fluid channels, respectively.

The transition portion is configured to transform the line configuration of the first fluid channels $B_{ij}$ by, between the first outer portion and the inner portion, gradually shifting every second first fluid channel in respective line relative to every other first fluid channel in respective line in a shift direction $D_2$ being transverse to the lines in the line configuration, and to transform the line configuration of the second fluid channels Cij by, between the second outer portion and the inner portion, gradually shifting every second second fluid channel in respective line relative to every other second fluid channel in respective line in the shift direction $D_2$.

Figure 14:
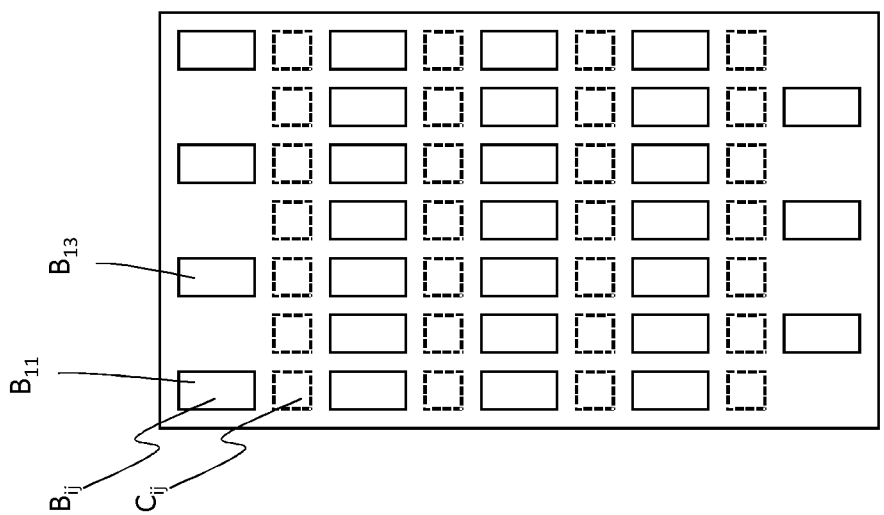
FIG. 14 shows schematically the end of FIG. 13 also indicating the position of channels from another header.

This shift is illustrated in FIG. 10 to FIG. 11 and in FIG. 14 to FIG. 15.

As can be seen in FIGS. 11 and 15, this results in a pattern where every second first fluid channels $B_{ij}$ and said every second second fluid channels $C_{ij}$ form lines across the shift direction $D_2$ alternating along the shift direction $D_2$ with lines across the shift direction $D_2$ formed of said every other first fluid channels and said every other second fluid channels. This way the line configuration at the interface between the header and the transition portion is transformed into a checkered pattern.

Figure 13:
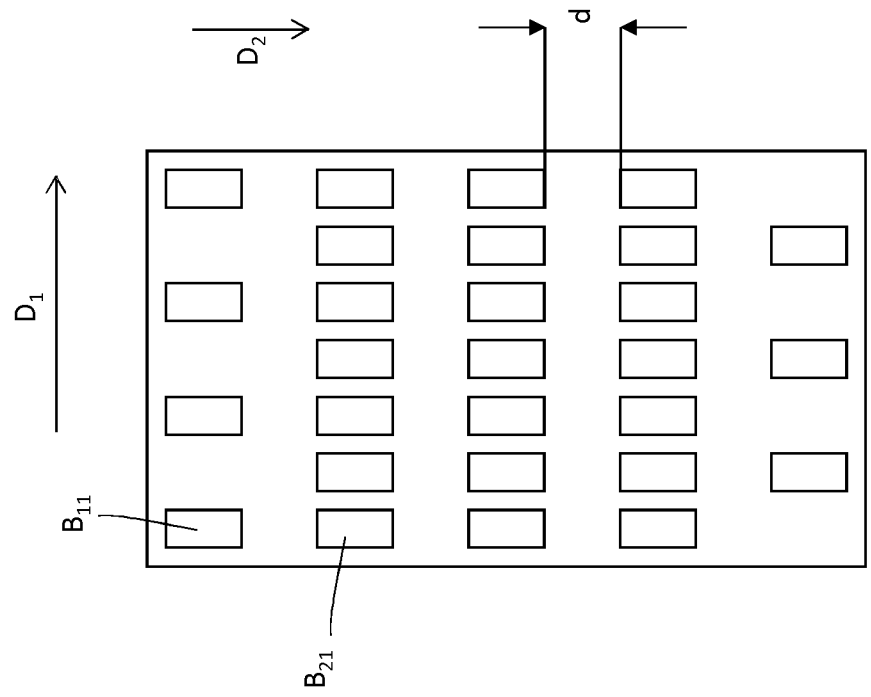
FIG. 13 shows schematically the other end of the header of FIG. 12.
Figure 12:
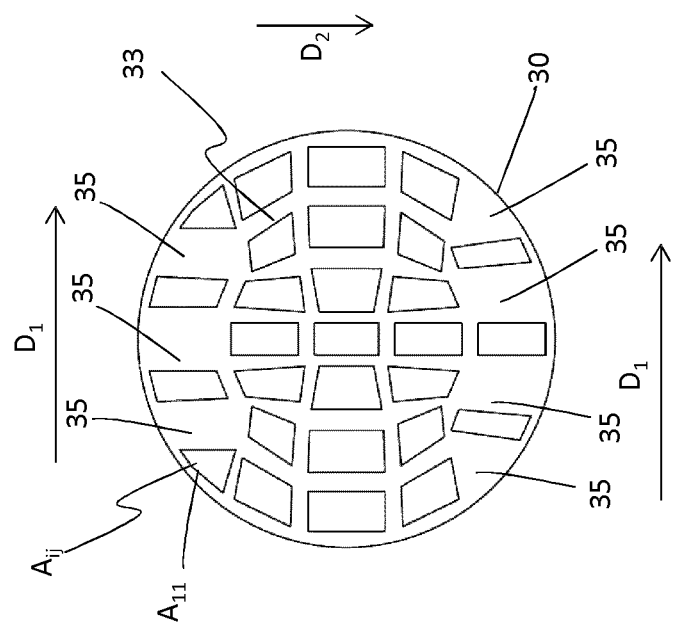
FIG. 12 is an end view of a header showing its round configuration at one end thereof.

It may be noted that the header 30 may at its first end 31 have a configuration of the mouths $A_{ij}$ of the channels $A_{ij}$ having the configuration shown in FIG. 12, where every second one of the areas 35 are blocked in two opposing perimeter lines. This is a suitable preparation to achieve the configuration shown in FIG. 13 at the second end 32 of the header. This is in turn a configuration which is suitable as a preparation to achieve the true checkered pattern shown in FIG. 15.

Figure 8:
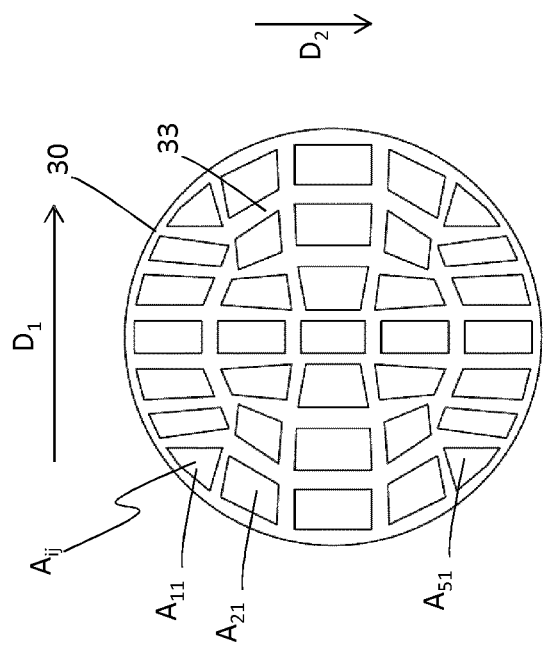
FIG. 8 is an end view of a header showing its round configuration at one end thereof.

Alternatively, the header 30 may have all the potential mouths $A_{ij}$ open as shown in FIG. 8. This is a suitable preparation to achieve the configuration shown in FIG. 9 at the second end 32 of the header. This is in turn a configuration which is suitable as a preparation to achieve the checkered pattern shown in FIG. 11.

The headers 30 may be formed by additive depositing of a material, such as a metallic material, preferably chosen from the group consisting of titanium or titanium based alloys, tantalum or tantalum based alloys, steel or steel based alloys, stainless steel or stainless steel based alloys. The material may be laser or electron sintered during the additive depositing of the metallic material, or sintered in an oven after the additive depositing.

The transition portions 20 may be formed by additive depositing of a material, such as a metallic material, preferably chosen from the group consisting of titanium or titanium based alloys, tantalum or tantalum based alloys, steel or steel based alloys, stainless steel or stainless steel based alloys.

The central heat exchanger body 10 may be formed by additive depositing of a material, such as a metallic material, preferably chosen from the group consisting of titanium or titanium based alloys, tantalum or tantalum based alloys, steel or steel based alloys, stainless steel or stainless steel based alloys. The material may be laser or electron sintered during the additive depositing of the metallic material, or sintered in an oven after the additive depositing.

Preferably the headers 30 and the transition portions 20 are integrally formed by additive depositing of a material, such as a metallic material, preferably chosen from the group consisting of titanium or titanium based alloys, tantalum or tantalum based alloys, steel or steel based alloys, stainless steel or stainless steel based alloys.

Preferably the central heat exchanger body 10, the transition portions 20 and the headers 30 are integrally formed by additive depositing of a material, such as a metallic material, preferably chosen from the group consisting of titanium or titanium based alloys, tantalum or tantalum based alloys, steel or steel based alloys, stainless steel or stainless steel based alloys.

The material may be laser or electron sintered during the additive depositing of the metallic material, or sintered in an oven after the additive depositing.

It is contemplated that there are numerous modifications of the embodiments described herein, which are still within the scope of the invention as defined by the appended claims.

The channels may for instance have other cross-sectional shapes than the rectangular and quadratic shapes shown in the drawings. The first fluid channels may e.g. have a circular shape and the second fluid channels may have a shape as a four sided polygon with inwardly bulging sides to fit in the area formed at the intersection of four neighboring circular first fluid channels. Other shapes, such as ovals, triangles, etc, are also conceivable.

The invention claimed is:

1. A header adapted to be connected to and form part of or being integrally formed as a part of a heat exchanger, the heat exchanger having a heat exchanger body with a plurality of discrete channels for a first fluid and a plurality of discrete channels for a second fluid, the header having:
   a first end having a round configuration being adapted to be connected to a circular pipe and to form an inlet to, or an outlet from, the heat exchanger; and
   a second end being adapted to be connected to or be integrally formed with the heat exchanger body and being provided with a plurality of discrete channels, wherein each discrete channel at the second end of the header is adapted to be individually connected to or integrally formed with one discrete channel of the plurality of discrete channels for the first fluid in the heat exchanger body,
   wherein the header is provided with a plurality of dividers dividing one or more internal channels of the header into the plurality of discrete channels at the second end,
   wherein all of the plurality of dividers at the second end extend from the second end to the first end and define a plurality of channel mouths at the first end, the channel mouths together forming the round configuration of the first end, and
   wherein the plurality of channels at the second end of the header are configured in a line configuration in that, in a cross-section across the plurality of channels, the plurality of channels is sub-divided into a plurality of groups, each group including a plurality of channels arranged along a line extending along a first direction across the cross-section of the second end.

2. A header adapted to be connected to and form part of or being integrally formed as a part of a heat exchanger, the heat exchanger having a heat exchanger body with a plurality of discrete channels for a first fluid and a plurality of discrete channels for a second fluid, the header having:
   a first end having a round configuration being adapted to be connected to a circular pipe and to form an inlet to, or an outlet from, the heat exchanger; and
   a second end being adapted to be connected to or be integrally formed with the heat exchanger body and being provided with a plurality of discrete channels, wherein each discrete channel at the second end of the header is adapted to be individually connected to or integrally formed with one discrete channel of the plurality of discrete channels for the first fluid in the heat exchanger body,
   wherein the header is provided with a plurality of dividers dividing one or more internal channels of the circular pipe into the plurality of discrete channels at the second end,
   wherein all of the plurality of dividers extend from the second end to the first end and define a plurality of channel mouths at the first end, the channel mouths together forming the round configuration of the first end,
   wherein the plurality of channels at the second end of the header are configured in a line configuration in that, in a cross-section across the plurality of channels, the plurality of channels is sub-divided into a plurality of groups, each group including a plurality of channels arranged along a line extending along a first direction across the cross-section of the second end, and
   wherein at least a sub-set of the dividers extend, in a cross-section across the channel mouths, along curved lines across the round configuration of the first end.

3. The header according to claim 1, wherein any upstream channel, as seen in a main direction extending from the first end to the second end, is connected to one or more downstream channels in the main direction.

4. The header according to claim 1, wherein adjacent lines are along a second direction, transverse to the first direction, separated a distance adapted to provide space for an intertwining of the line configured plurality of channels for the first fluid with a line configured plurality of channels for the second fluid.

5. The header according to claim 1, wherein the plurality of discrete channels at the second end are provided in a grid having a rectangular configuration.

6. The header according to claim 1, wherein the one or more dividers have longitudinal extensions along a main direction extending from the first end to the second end being at least two times a minimum cross-sectional dimension of respective one of the plurality of channels at the second end.

7. A heat exchanger comprising:
   a central heat exchanger body with a plurality of discrete channels for a first fluid and a plurality of discrete channels for a second fluid; and
   the header according to claim 1.

8. The heat exchanger according to claim 7, wherein the plurality of discrete channels for the first fluid and the plurality of discrete channels for the second fluid are in the central heat exchanger body arranged in a checkered pattern as seen in a cross-section extending across the plurality of discrete channels in the central heat exchanger body.

9. The heat exchanger according to claim 7, further comprising
   a transition portion having:
     a first outer portion in connection with the header forming a first fluid header for the first fluid;

a second outer portion in connection with a further header forming a second fluid header for the second fluid; and
an inner portion in connection with the central heat exchanger body,
wherein the first outer portion is provided with a plurality of channels for the first fluid forming first fluid channels arranged in a line configuration,
wherein the second outer portion is provided with a plurality of channels for the second fluid forming second fluid channels arranged in a line configuration, and
wherein the inner portion is provided with the first fluid channels and the second fluid channels arranged in a checkered pattern.

10. The heat exchanger according to claim 9, wherein the transition portion is configured to transform the line configuration of the first fluid channels by, between the first outer portion and the inner portion, gradually shifting every second first fluid channel in respective line relative to every other first fluid channel in respective line in a shift direction being transverse to the lines in the line configuration, and wherein the transition portion transforms the line configuration of the second fluid channels by, between the second outer portion and the inner portion, gradually shifting every second second fluid channel in respective line relative to every other second fluid channel in respective line in the shift direction,
whereby said every second first fluid channels and said every second second fluid channels form lines across the shift direction alternating with lines formed of said every other first fluid channels and said every other second fluid channels.

11. The heat exchanger according to claim 9, wherein the transition portion is integrally formed with the header and/or with the central heat exchanger body.

12. The heat exchanger according to claim 9, wherein the heat exchanger comprises:
a central heat exchanger body;
two transition portions, one at either end of the central heat exchanger body; and
four headers, at respective outer portions of the transition portions,
integrally formed into a single body.

13. The heat exchanger according to claim 9, wherein the transition portion is integrally formed with the header.

14. The heat exchanger according to claim 9, wherein the transition portion is integrally formed with both the header and the central heat exchanger body.

15. The header according to claim 2, wherein any upstream channel, as seen in a main direction extending from the first end to the second end, is connected to one or more downstream channels in the main direction.

16. The header according to claim 2, wherein the dividers extend from the second end to the first end, wherein each of the channel mouths formed at the first end is associated with a discrete channel extending through the header, wherein the discrete channels extending through the header form the plurality of discrete channels at the second end of the header.

17. The header according to claim 3, wherein the dividers extend from the second end to the first end, wherein each of the channel mouths formed at the first end is associated with a discrete channel extending through the header, wherein the discrete channels extending through the header form the plurality of discrete channels at the second end of the header.

* * * * *